(12) United States Patent
Wen et al.

(10) Patent No.: US 7,529,748 B2
(45) Date of Patent: May 5, 2009

(54) INFORMATION CLASSIFICATION PARADIGM

(76) Inventors: Ji-Rong Wen, Microsoft Research ASIA, 5F, Beijing Sigma Center, No. 49 Zhichun Rd., Haidian District, Beijing (CN) 100080; Yan-Feng Sun, Microsoft Research ASIA, 5F, Beijing Sigma CEnter, No. 49 Zhichun Rd., Haidian District, Beijing (CN) 100080; Wei-Ying Ma, Microsoft Research ASIA, 5F, Beijing Sigma Center, No. 49 Zhichun Rd., Haidian District, Beijing (CN) 100080; Zaiqing Nie, Microsoft Research ASIA, 5F, Beijing Sigma Center, No. 49 Zhichun Rd., Haidian District, Beijing (CN) 100080; Renkuan Jiang, Room 262, 4 Building, New Chungchunyuan, Peking University, Haidian District, Beijing (CN) 100080

( * ) Notice: Subject to any disclaimer, the term of this patent is extended or adjusted under 35 U.S.C. 154(b) by 68 days.

(21) Appl. No.: 11/276,818

(22) Filed: Mar. 15, 2006

(65) Prior Publication Data

US 2007/0112756 A1 May 17, 2007

Related U.S. Application Data

(60) Provisional application No. 60/736,676, filed on Nov. 15, 2005.

(51) Int. Cl.
  G06F 17/30 (2006.01)
(52) U.S. Cl. .................................. 707/7; 707/3; 707/10
(58) Field of Classification Search ........................ None
  See application file for complete search history.

(56) References Cited

U.S. PATENT DOCUMENTS

| | | | |
|---|---|---|---|
| 5,983,246 | A | 11/1999 | Takeno |
| 6,266,664 | B1 | 7/2001 | Russell-Falla et al. |
| 6,484,149 | B1 | 11/2002 | Jammes et al. |
| 6,505,195 | B1 | 1/2003 | Ikeda et al. |
| 6,751,614 | B1 | 6/2004 | Rao |
| 6,892,191 | B1 | 5/2005 | Schaffer |

(Continued)

FOREIGN PATENT DOCUMENTS

WO WO 01/27712 A2 4/2001

OTHER PUBLICATIONS

Liu Hui et al., "An Efficient Centroid Based Chinese Web Page Classifier", Proceedings of Network Research Workshop in 16th APAN Meetings, 2003, pp. 9-14.

(Continued)

*Primary Examiner*—Christian P. Chace
*Assistant Examiner*—Bai D Vu

(57) ABSTRACT

A mechanism to classify source documents into one of two categories, either likely to contain desired information or unlikely to contain desired information. Generally some form of rules based classification in conjunction with deeper analysis using advanced techniques on difficult cases is utilized. The rules based classification is generally good for eliminating cases from further consideration and for identifying documents of interest based on generally discernable relationships between data or based on the presence or absence of data. The deeper analysis is used to uncover more complex relationships between data that may identify documents of interest. Portions of the process may use the entire document while other portions of the process may use only a portion of the document.

13 Claims, 5 Drawing Sheets

U.S. PATENT DOCUMENTS

| | | | |
|---|---|---|---|
| 6,920,609 B1 * | 7/2005 | Manber et al. | 715/513 |
| 7,016,895 B2 * | 3/2006 | Dehlinger et al. | 707/5 |
| 7,035,841 B2 | 4/2006 | Chidlovskii | |
| 2003/0046161 A1 * | 3/2003 | Kamangar et al. | 705/14 |
| 2003/0101181 A1 | 5/2003 | Al-Kofahi et al. | |
| 2003/0225763 A1 * | 12/2003 | Guilak et al. | 707/7 |
| 2004/0111453 A1 | 6/2004 | Harris et al. | |
| 2004/0138946 A1 | 7/2004 | Stolze | |
| 2004/0199430 A1 * | 10/2004 | Hsieh | 705/26 |
| 2005/0066269 A1 | 3/2005 | Wang et al. | |
| 2005/0131764 A1 * | 6/2005 | Pearson et al. | 705/26 |
| 2005/0251536 A1 | 11/2005 | Harik | |
| 2006/0026496 A1 | 2/2006 | Joshi et al. | |
| 2006/0149710 A1 * | 7/2006 | Koningstein et al. | 707/3 |

OTHER PUBLICATIONS

Oh-Woog Kwon et al., "Web Page Classification Based on k-Nearest Neighbor Approach", Proceedings of the fifth international workshop on Information retrieval with Asian languages, 2000, pp. 9-15.

W. W. Cohen, "Improving a Page Classifier with Anchor Extraction and Link Analysis", Neural Information Processing Systems Foundation, 2002.

M. Labsky et al., Information Extraction from HTML Product Catalogues: from Source Code and Images for RDF, Proceedings of the 2005 IEEE/WIC/ACM International Conference on Web Intelligence, 2005, pp. 401-404.

C. J.C. Burges, "A Tutorial on Support Vector Machines for Pattern Recognition", Data Mining and Knowledge Discovery, 2, 1998, pp. 121-167.

International Search Report, PCT/US2006/044476 Apr. 24, 2007, pp. 1-11.

* cited by examiner

INFORMATION CLASSIFICATION PARADIGM

CROSS-REFERENCE TO RELATED APPLICATION(S)

This application claims the benefit of U.S. Provisional Patent Application Ser. No. 60/736,676, filed Nov. 15, 2005, titled "INFORMATION CLASSIFICATION PARADIGM", which is incorporated herein by reference.

TECHNICAL FIELD

The disclosed subject matter relates generally to data processing and, more particularly, to organizing information into separate classifications based on particular characteristics of the information.

BACKGROUND

Interconnected computers forming networks may have large repositories of data that can be mined for useful information. Although many examples exist, one common example is the Internet, with its decentralized structure of independent hosts which encourages rich exchanges of enormous amounts of data. However, mining useful information from a relatively unstructured source, such as HTML or other type of documents, can be difficult. Locating and identifying relevant information is typically not easy as the largely unstructured nature of the documents does not generally break out the information in the documents by type, value, purpose, etc. As the amount of data grows and the update cycle shortens, extracting desired information from such data becomes increasingly complex.

SUMMARY

The following presents a simplified summary of the disclosure in order to provide a basic understanding to the reader. This summary is not an extensive overview of the disclosure and it does not identify key/critical elements of the invention or delineate the scope of the invention. Thus, it should not be used to limit the scope of the claimed subject matter. Its sole purpose is to present some concepts disclosed herein in a simplified form as a prelude to the more detailed description that is presented later.

This disclosure describes mechanisms to classify a group of source documents as being likely to include information of interest or not likely to include information of interest. Some examples have two basic classifiers. One classifies documents into one of three groups: likely to contain information of interest; not likely to contain information of interest; or needing further examination. In many instances this classifier can be set up to quickly eliminate a majority of the documents from further consideration based on the presence or absence of at least one classification identifier.

The first classifier may also search a snippet of the file (e.g. a portion extracted according to a set of rules, typically from the vicinity of the classification identifier) for further information in order to try to identify those documents that should be classified as likely to contain information of interest.

In some instances, however, more complex analysis must be performed. Thus, the cases that the first classifier cannot clearly identify are passed to a feature extractor which extracts a set of features, possibly from the snippet, and forms a feature vector. This feature vector is used by a second classifier to do more complex analysis in order to determine whether the document is likely to contain information of interest.

BRIEF DESCRIPTION OF THE DRAWINGS

The ensuing detailed description section will be more readily appreciated and understood when read in conjunction with the accompanying drawings, wherein.

The same reference numerals and/or other reference designations employed throughout the accompanying drawings are used to identify identical components except as may be provided otherwise.

DETAILED DESCRIPTION

The accompanying drawings and this detailed description provide exemplary implementations relating to the disclosed subject matter for ease of description and exemplary purposes only, and therefore do not represent the only forms for constructing and/or utilizing one or more components of the disclosed subject matter. Further, while this description sets forth one or more exemplary operations that may be implemented as one or more sequence(s) of steps expressed in one or more flowcharts, the same or equivalent operations and/or sequences of operations may be implemented in other ways.

Figure 1:
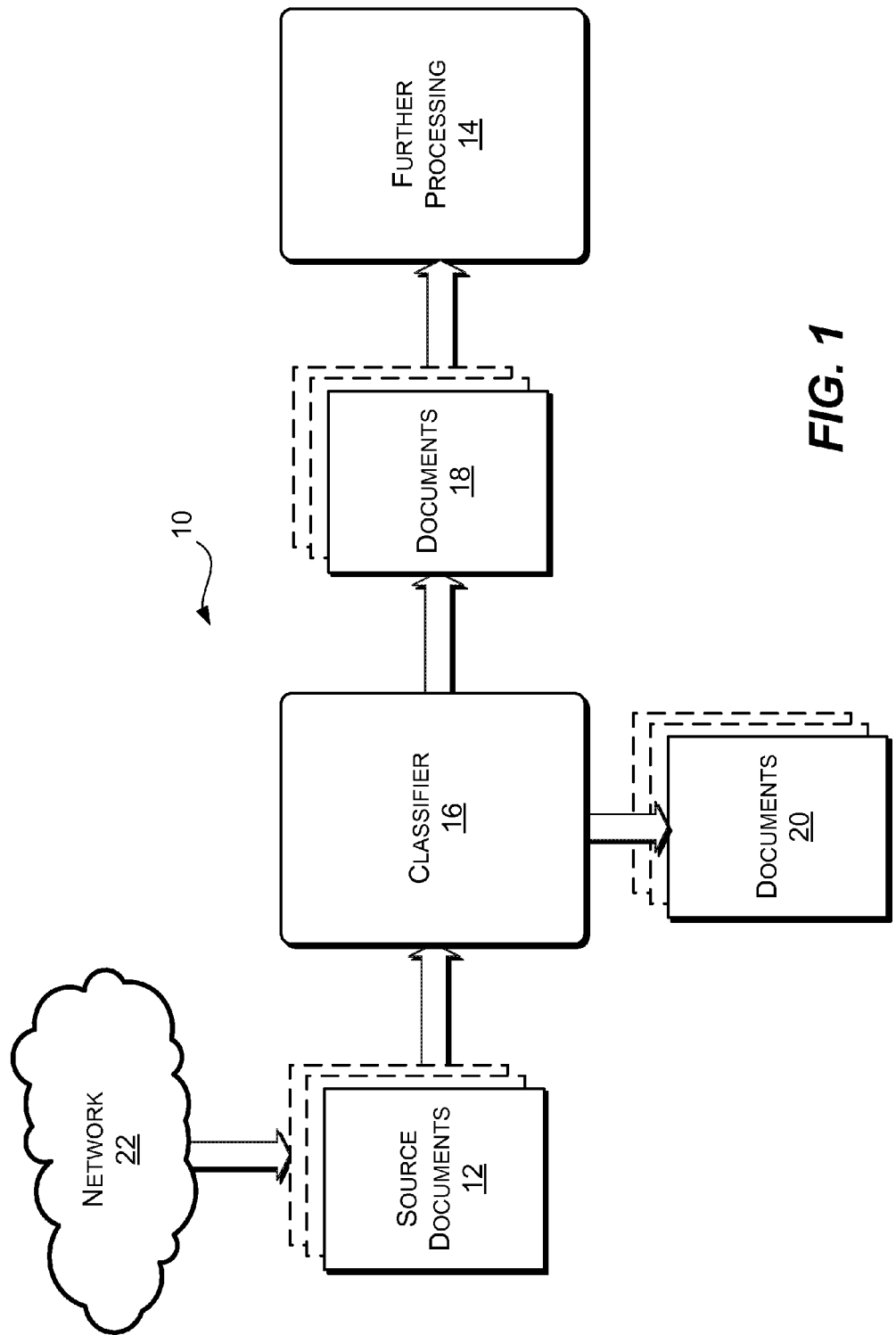
FIG. 1 is a general functional diagram of an example of an information classification system.

FIG. 1 illustrates, at a high level, an exemplary information classification system 10. The diagram is designed to illustrate the system from a functional standpoint, rather than illustrate any particular implementation. In system 10, source documents 12 may contain information of interest, which may possibly be extracted for further use or processing as illustrated by further processing block 14. However, rather than subject all of source documents 12 to further processing, it may be desirable to first sort the documents into classifications, one classification having a high likelihood of containing information of interest and another classification having a lower likelihood of containing information of interest.

In FIG. 1, classification is performed by classifier 16, which identifies source documents 12 as either having a high likelihood of containing information of interest (source documents 18) or a lower likelihood of containing information of interest (source documents 20).

In FIG. 1, source documents 12 are illustrated as being stored or being retrieved from network 22. However, this is shown by way of illustration only. How source documents 12 are identified and made available to classifier 16 is largely irrelevant to the core of the disclosure.

As a practical illustration of how such a system might be employed, consider the problem of identifying web pages from the Internet that have information of interest. In such an illustration, network 22 would then be the Internet and source documents 12 could be web pages or other document types that may or may not contain information of interest. Such source documents may be retrieved by a web crawler or made available by some other method.

As one example, perhaps a company wants to provide information related to products, containing such information as the product description, the price, the supplier, etc. Identifying pages that contain product information and distinguishing them from pages that do not contain such product information is a complex task. The task is made even more complex by the fact that the data in web pages or other documents is relatively unstructured and generally does not contain sufficient descriptive information to allow the desired product information to be readily identified and extracted from the page. However, if pages containing product information could be identified, then the relevant information could be extracted and used in a variety of ways or provided in a variety of formats. For example, the relevant information can be extracted and supplied in an XML shopping feed, or a catalog could be compiled, or a directory assembled, or any number of other things.

Returning to FIG. 1, the classifier is illustrated as classifying documents into one of two categories. However, the classifier could also provide any number of categories. The classifier may also supply additional information, such as the confidence level describing how likely a document is to contain relevant information. Finally, the classifier may make no judgments on classification at all, but simply provide the confidence level and leave further processing to another system or module.

Figure 2:
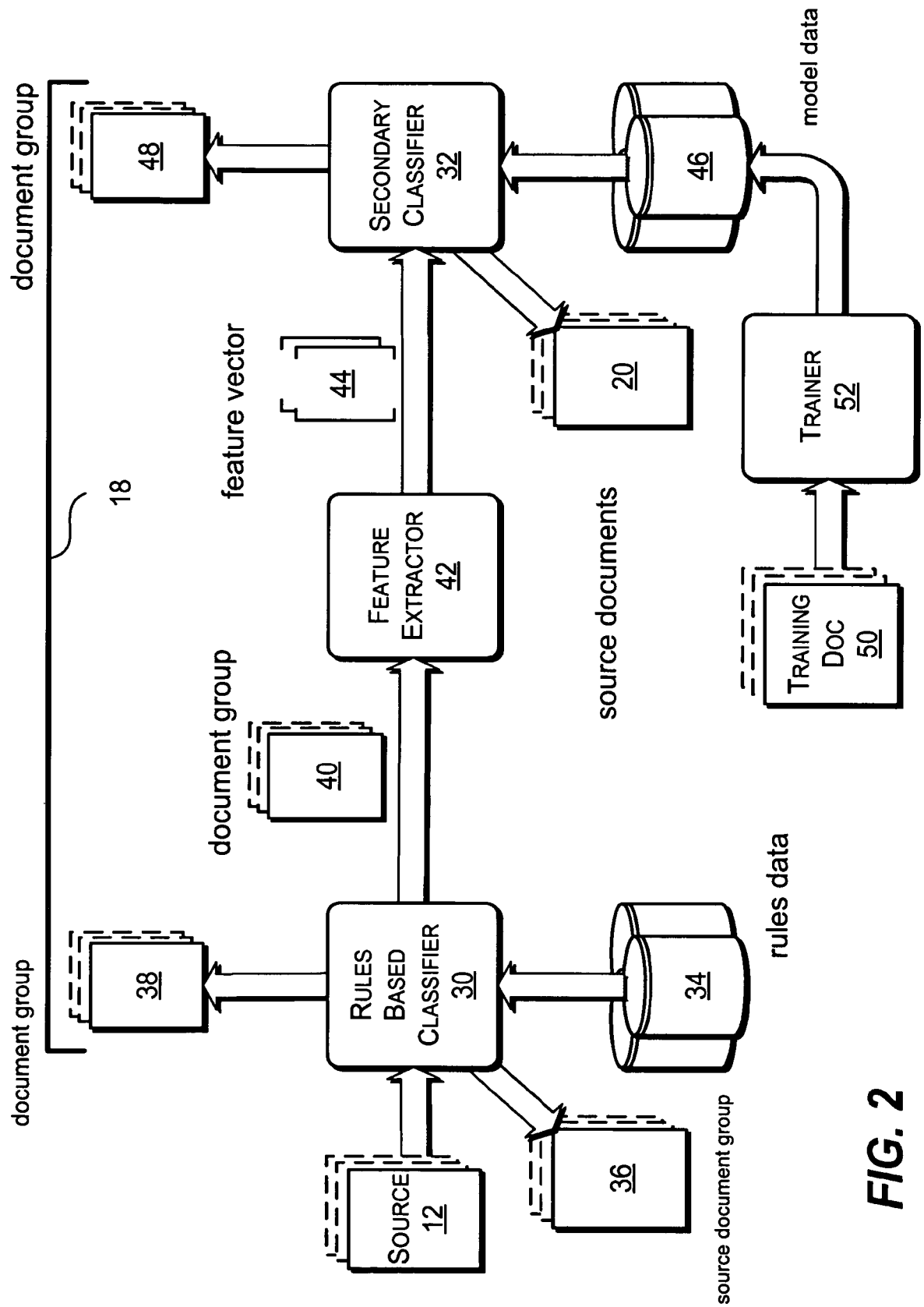
FIG. 2 is a more detailed functional diagram of an example information classification system.

Turning now to FIG. 2, an example functional illustration of a classifier, such as classifier 16 is presented. In FIG. 2, the illustrative classifier utilizes two different mechanisms to identify whether documents contain information of interest. These mechanisms are illustrated by rule based classifier 30 and secondary classifier 32.

In many instances, information of interest contains certain identifiable characteristics, herein called classification identifiers. Using the example presented above, if we are interested in product information, including pricing, the information of interest is likely to contain a currency or price identifier such as $ for dollars, € for euros, etc. Identifiable characteristics, such as a price identifier are suited to identification by rules based classifier 30. In addition, often certain classification identifiers, such as a currency identifier, can be used to quickly sort out source documents that have a low likelihood of containing the desired information. Continuing on with this example, it is much more likely that a product page will have a price such as "$100.00", rather than a price such as "one hundred dollars". Thus, in this example, if a currency identifier is not located, the likelihood the source document contains information of interest is low and such a document may be quickly discarded. Note that even if a source document contains a currency identifier, it still may not have information of interest, but in this example, the currency identifier can quickly eliminate source documents of low likelihood. Such an approach saves computing resources for focusing on those cases that have a much higher likelihood of having relevant information.

In FIG. 2, rules based classifier 30 utilizes rules data 34 to define its behavior. Rules data 34 may contain such information as classification identifiers that classifier 30 should contain or exclude, rules that should be applied, etc. Note that in the example above, classification identifiers have been illustrated as text. However, note that classification identifier can be much broader than text and can include, for example, structural elements or data structures contained in the source document. For example, if a source document is an HTML document, classification identifiers can include such things as text, HTML tags, links, data, etc. Basically any identifying element of a source document can be utilized as a classification identifier.

As illustrated in FIG. 2, classifier 30 produces one of three results. Classifier 30 can identify a document as having a low likelihood of containing any information of interest. This is illustrated by source document group 36. Additionally, classifier 30 can identify a document as having a high likelihood of containing information of interest. This is illustrated by document group 38. Finally, there may be instances when classifier 30 cannot determine with any certainty which category the document should be classified into. This is illustrated by document group 40.

Although the classification process has been described in terms of high likelihood, and low likelihood, these terms are simply descriptive of documents of interest or not of interest. The actual classifier may or may not explicitly utilize the concept of likelihood. In some instances the classification criteria may actually calculate a likelihood metric and then use the likelihood metric to identify a category. In other instances, the concept of likelihood may be 'built in' to the criteria classifier. Similarly, when a document is classified as either of interest or not, in some instances there may be a likelihood (or confidence metric) output as well while in others, no likelihood metric will be output.

Using the example previously described, if the system is looking for product information, if the document does not contain a currency identifier, then it is classified as of no interest. Setting classification criteria using this rule equates the absence of a currency identifier with low likelihood. Such rules may be derived through an analysis of the typical way that product information pages are constructed or through other means.

It should be noted that the rules utilized by rules based classifier 30 can be based on the presence or absence of any number or type of classification identifier. In addition other criteria may also be used by rules based classifier 30 to classify documents.

There may be certain instances where the presence or absence of classification identifiers in any combination will not determine with certainty the classification of a document. In such a situation, a deeper analysis is generally needed. In some instances, identification of whether a particular source document contains information of interest or not requires an analysis of more complex factors, such as the types of information contained in the document, the interrelation between the types of information, the content of the information and so forth.

In such instances, a rules based engine may not be the most suitable tool for identifying which source documents contain information of interest. In the example illustrated in FIG. 2, the more complex analysis is performed by feature extractor 42 and secondary classifier 32.

Feature extractor 42 extracts from a document in document group 40 at least one feature, the components of which can be represented by feature vector 44. Feature vector 44 is then analyzed by secondary classifier 32. Secondary classifier 32 may be of the type that utilizes model data, such as model data 46. If classifier 32 is of such a type then using model data 46, secondary classifier 32 then classifies the document as having information of interest, represented by document group 48. Note that the combination of document groups 38 and 48 yields the group of documents identified in FIG. 1 as 18.

The more complex analysis performed by classifier 32 is often needed to uncover the complex relationships among features of a document that indicates whether the document contains information of interest. As previously mentioned, the mechanisms utilized by classifier 32 may use model data, such as model data 46 to captures the complex interrelationships that allow documents containing information of interest to be distinguished from documents lacking information of interest. Model data 46 is typically created using a set of training data 50 in conjunction with model trainer 52.

Many different types of technologies and mechanisms may be suitable for secondary classifier 32. By way of illustration, and not limitation, such mechanisms may include classifiers based on filtering or estimation, such as Kalman, maximal likelihood filters or some Bayesian approach, on neural network or other pattern recognition approaches, or a variety of other technologies. In one example, secondary classifier 32 may be based on Support Vector Machines (SVM). A SVM based classifier is premised on the idea of structural risk minimization rather than empirical risk minimization. It maps the input vectors, such as feature vector 44, to a high-dimensional space and applies a hyperplane which leaves the maximum margin between two classes. Given a labeled training data set:

$$D=\{X_i, y_i\}_{i=1}^t$$

Where:

$$y_i \in \{1,-1\}$$

The corresponding decision function of SVM has the following form:

$$f(X) = \text{sign}\left(\sum_{i=1}^d \alpha_i y_i K(X_i, X) - b\right)$$

Where K is the kernel function. Typical kernel functions, include, but are not limited to, polynomial kernel functions, Gaussian RBF kernel, sigmoid kernel, and so forth. SVM technology is well known and described in a variety of references and publications and more need not be recited here.

Although this discussion has been illustrated with both a rules based classifier 30 and a secondary classifier 32, these are simply for the purposes of illustration. A particular implementation may have a different combination of classifiers, based on different technologies.

In the above discussion of FIG. 2, it should be clear that the core of the description is locale and language independent. However, in a specific application, the classification model may be language or locale dependent. Returning again to an example where classifier 30 is looking for a currency identifier to perform rough classification, which currency identifier classifier 30 needs to look for may be based on the language or the locale (or both) of the source document. Thus, rules data 34 and/or model data 46 may be different depending on the particular language or locale of the source document. In addition, rules data 34 and/or model data 46 may be different depending on any number of other factors as well. In other words, language and locale are just examples of factors that may be considered when selecting rules and/or model data.

Language or locale, or other factors, may influence not only rules data 34 and/or model data 46, but also the structure of the classification system in some instances. For example, it may be desirable to apply rules in a different sequence depending on the language, locale, or some other factor, or combinations thereof.

Although FIG. 2 has shown rules based classifier 30 and secondary classifier 32 as separate for purposes of illustration, it should be noted that they can be combined into a single classification entity or applied in a different order.

Figure 3:
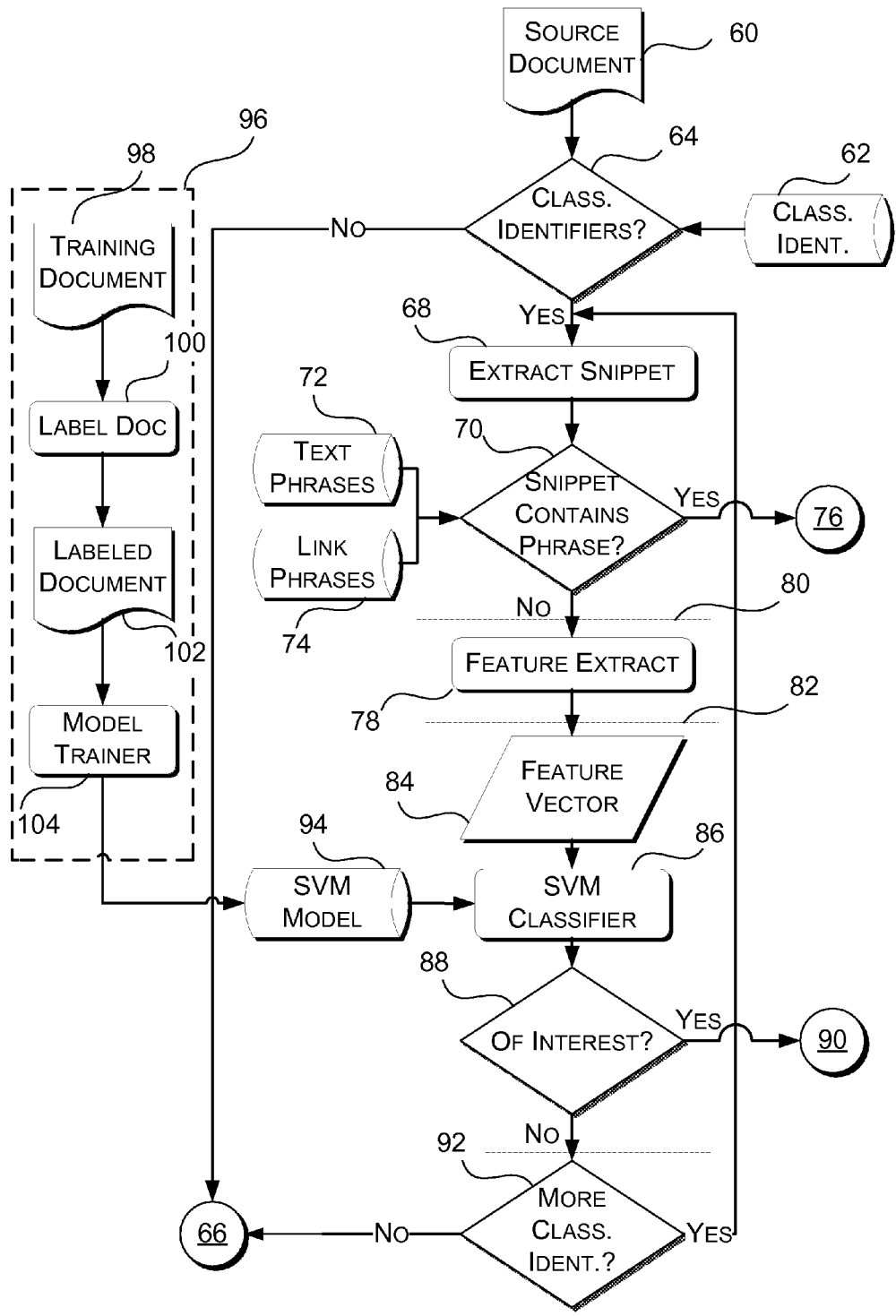
FIG. 3 is flow diagram of an example information classification system.

Turning now to FIG. 3, a particular example will be illustrated with respect to a flow diagram. In this example, a general description of a step will typically be given followed by a more specific example or examples. The specific example (or examples) are used simply for illustration purposes and are not intended to limit the ultimate scope of the invention.

The process in FIG. 3 begins when source document 60 is searched for at least one classification identifier 62. This is illustrated by decision block 64. Note that decision block 64 may be looking for the presence of absence of a particular classification identifier. Additionally, decision block 64 may be looking for the presence or absence not of a particular classification identifier, but rather the presence of absence of a pattern or set of classification identifiers. Other options are also possible.

In on representative example, decision block 64 tests for the presence or absence of at least one classifier that may be used to exclude source documents from further consideration. For example, if the price of a set of goods or services is of interest and if most source documents describing the price of goods or services utilizes a currency identifier, then decision block 64 may test for the presence or absence of a suitable currency identifier. In a different example, if data expressed as a percentage is of interest, a classification identifier containing the "%" symbol (or its equivalent) may be tested by block 64. In a further example, perhaps an assemblage of HTML pages having a particular link are of interest and a classification identifier having link properties could be tested.

If block 64 determines that the desired classification identifier is absent (or present depending on how the test is set up) then the document may be sorted as not of interest as illustrated by block 66 and the next document (if any) can be examined.

If block 64 determines that the desired classification identifier is present (or absent depending on how the test is set up), then block 68 extracts from the document an appropriate classification identifier snippet.

In many instances, the relevant information in documents of interest has a certain 'closeness'. If, for example, we are interested in prices, then most likely the numerical value following the currency identifier is going to be of interest. It is, therefore, possible to work with a subset of the document, called a snippet, instead of the entire document. As used herein, a snippet is a portion of the document that is less than, or equal to, the entire whole. In addition, a snippet provides a natural window that can be used to bound the applicability of rules in a rules based classifier. For example, a search for key words or phrases that we expect to be found in close proximity to a classification identifier can be bounded by a paragraph break in a text document. In other types of documents, other criteria may be used to determine what portion is extracted as a snippet.

Many, if not most, source documents containing largely unstructured data still contain structures that can be useful in helping identify where the information of interest may be. For example, a text document may have paragraphs, pages, sentences, figures, tables, and other structures in addition to the text or information associated with them. An HTML document may contain a variety of tags, data structures, components, controls, executable code, and so forth in addition to the value of the data associated with each of these items.

In one example using an HTML document, a snippet may contain a certain number of tags before and/or after a classification identifier. This number may be set at some initial number and then tuned or adjusted according to a variety of criteria. In one embodiment, the snippet taken is ten tags before and ten tags after a classification identifier, although other values are useful and may be used in alternative embodiments. In another example using a text document, a snippet may contain a certain number of words, sentences, paragraphs or pages before and/or after a classification identifier.

In addition, a snippet may be created by using only certain features in calculating how much of the document to include in a snippet. For example, suppose the source documents are stored in HTML and the likelihood the document contains information of interest is more readily discernable by examining only certain types of tag structures (e.g. some tag structures do not carry information that will be useful in making a likelihood determination). In this instance, it may be desirable to consider only certain types of tags when considering the snippet. In a particular example, four elements are considered: the <A> tag; the <IMG> tag; the <INPUT> tag; and the text element. If the document were a text document, or other type of document, the structures or features that would be important to consider when selecting a snippet may be different, but the principle remains the same.

Once at least one relevant snippet has been identified, decision block 70 uses identification snippet phrases 72 and/or 74 to locate phrases around the classification identifier that tend to indicate that the document contains information of interest. Identification snippet phrases may also be referred to 'keywords.' It is important to note that these snippet phrases/keywords can be more than simple text. Snippet phrases/keywords can be any information, object, construct, data, etc. within the document. In FIG. 3, a particular example of snippet phrases is illustrated in 72 and 74. In FIG. 3, identification snippet phrases 72 is targeted toward phrases that would likely be found in text surrounding the classification identifier in documents of interest while identification snippet phrases 74 is targeted toward phrases that would likely be found in links surrounding the classification identifier.

Such an arrangement is particularly useful when the source document is in HTML. In other types of source documents, other types of snippet phrases may be useful. However, this illustrates that in a situation where phrases vary depending on the type of structure or data that surrounds the classification identifier, it may be desirable to search for different phrases in different types of structures.

Assuming a relevant phrase is found, then the document is classified as of interest as illustrated in block 76. If a relevant phrase is not found, then feature extraction occurs in block 78.

Although block 70 is illustrated as searching for a phrase, block 70 can also be configured to search for the absence of a phrase, some combination of the presence of absence of multiple phrases, or other type of logic.

In FIG. 3, the blocks above dashed line 80 represent one possible example of a rules based classifier, such as rules based classifier 30 illustrated in FIG. 2. Note that in this particular example the rules tended to be coded into the structure of the classifier. However, in alternative examples, rules may be expressed in some logic type language and used to customize a more general rules based classifier.

If the snippet does not contain the search phrases surrounding the classification identifier, then in order to determine whether the document is likely to contain information of interest may require a more sophisticated analysis of the information contained in the snippet. Thus, block 78 illustrates that features are extracted from the snippet so they can be examined further. Block 78, illustrated in FIG. 3 between dashed lines 80 and 82 is one possible example of feature extractor 42 in FIG. 2.

Figure 4:
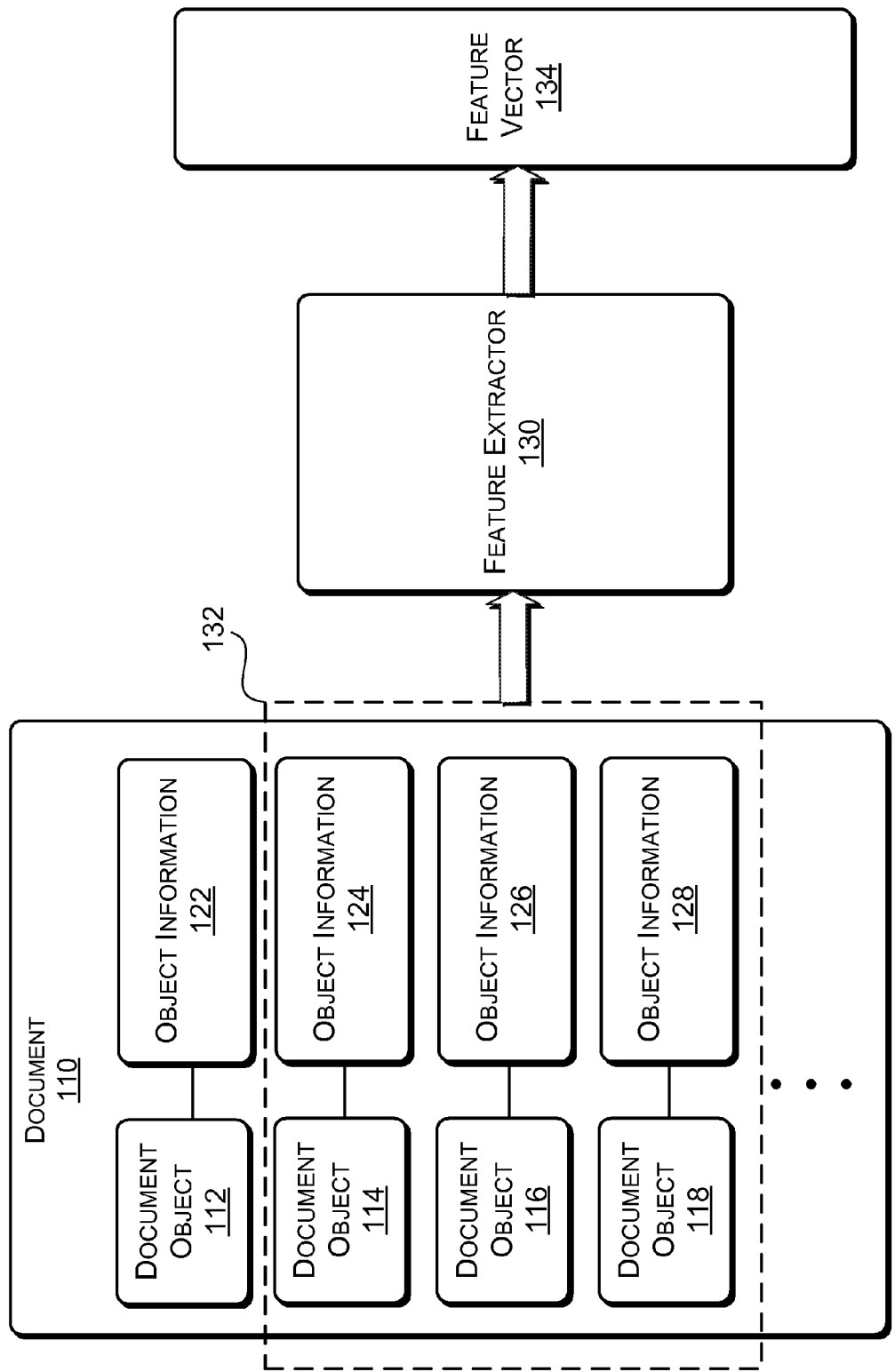
FIG. 4 is a functional illustration of snippet and feature vector creation.

Turning for a moment to FIG. 4, further details about feature extraction will be discussed. In FIG. 4, document 110 represents a document that may contain information of interest. As previously discussed, even if such documents are largely unstructured, they typically have at least some structures that are useful in identifying whether the document contains information of interest.

In FIG. 4, these structures are illustrated by document objects (labeled 112, 114, 116, and 118) and their associated object information (labeled 122, 124, 126, and 128). As used herein, the term object is very broad. It includes any structure in the document. Examples of objects include, but are not limited to, HTML tags, links, executable objects, constructs, buttons, controls, paragraphs, tables, pages, and so forth. Typically, an object will have associated object information, such as text, values, and so forth.

In FIG. 4, a snippet is denoted by dashed line 132. Snippet 132 is an example of a snippet identified by block 68 of FIG. 3. Snippet 132 is processed by feature extractor 130 in order to extract features of interest. Feature extractor 130 is another example of feature extractor 42 of FIG. 2.

Features are aspects of a document or snippet that are of interest. As will become more apparent from the examples below, features include not only objects in a document, but information associated with that object, information that may be extracted by manipulating the information (such as calculating ratios, evaluating information according to a metric, etc.), or any other aspect of the document that may be helpful in ascertaining whether the document contains information of interest.

Once the desired features are extracted from snippet 132 by feature extractor 130, they are typically assembled into a feature vector, such as feature vector 134 of FIG. 4. As used herein, the term 'vector' is not utilized to mean any particular type of data structure. The term is used, rather, as a useful means of referring to that collection of features that are extracted for further use in the system.

In order to extract features from the snippet, a set of rules must be established to identify what features are of interest. In general, which features are of interest will be based on the particular information that is of interest. In other words, given a particular type of information that is of interest, and a snippet that may contain such information, certain features in the snippet may be more important than others in identifying whether the snippet contains the desired information. However, it is often not clear which features are important since the determination can only be made based on a complex set of relationships among the features of the snippet.

Thus, it may be desirable to, at least initially, identify and extract a large set of features to form a feature vector which can then be further examined for such a set of complex relationships by SVM or other suitable method. In a representative example using HTML documents as source documents and looking for pages describing products, an example feature vector may comprise some or all the features in Table 1 below.

TABLE 1

Example feature vector

| Feature Number | Description |
| --- | --- |
| 1 | Snippet contains a picture |
| 2 | Snippet contains a link |
| 3 | Snippet contains a picture with a link |

TABLE 1-continued

Example feature vector

| Feature Number | Description |
|---|---|
| 4 | Snippet contains a picture with a link and which is the same as another link |
| 5 | Snippet contains a jpg image |
| 6 | Snippet contains an 'input' or 'submit' tag |
| 7 | Snippet contains a price tag that has sufficient characters in its text to indicate an accurate price (example, less than 10) |
| 8 | Snippet contains a has a currency symbol in other free text not counting the tag containing the price identifier |
| 9 | Snippet contains a price tag that has a link attribute |
| 10 | Snippet contains two tags that have the same link |
| 11 | Snippet contains a hidden input tag |
| 12 | Snippet contains an image tag with alternative text that has all the free text in any other tags |
| 13 | Snippet contains a jpg image that has alternative text |
| 14 | Snippet contains a tag with image, link and text |
| 15 | Ratio of image tags to total number of tags |
| 16 | Ratio of tags with free text to total number of tags |
| 17 | Ratio of tags with link to total number of tags |
| 18 | Ratio of tags with image and link to total number of tags |
| 19 | Ratio of tags with text and link to total number of tags |
| 20 | Ratio of tags with image, text and link to total number of tags |

In another example, a feature vector can comprise some or all of the features in Table 2 below.

TABLE 2

Example feature vector

| Feature Number | Feature Description |
|---|---|
| 1 | Average word length in characters |
| 2 | Calculated average word length in characters |
| 3 | Average paragraph length in characters |
| 4 | Average paragraph length in words |
| 5 | Average paragraph length in sentences |
| 6 | Average section length in characters |
| 7 | Average section length in paragraphs |
| 8 | Average section length in sentences |
| 9 | Average section length in words |
| 10 | Average sentence length in characters |
| 11 | Average sentence length in words |
| 12 | Calculated document length in characters |
| 13 | Calculated document length in words |
| 14 | Number of words of length N |
| 15 | Standard deviation of word lengths in document |
| 16 | Variance of word lengths in document |
| 17 | Number of non-space characters |
| 18 | Number of total characters |
| 19 | Number of words |
| 20 | Square root of word count |
| 21 | Quad root of word count |
| 22 | Number of spelling errors (total) |
| 23 | Number of likely typos (cf. AutoCorrect) |
| 24 | Number of probably non-typo spelling errors |
| 25 | Number of sentences (punctuation delimited) |
| 26 | Number of passive sentences |
| 27 | Number of active sentences |
| 28 | Number of grammar errors |
| 29 | Number of paragraphs |
| 30 | Number of sections |
| 31 | Number of pages |
| 32 | Ratio of spelling error count to character count |
| 33 | Ratio of spelling error count to total character count |
| 34 | Ratio of spelling error count to word count |
| 35 | Ratio of spelling error count to sentence count |
| 36 | Ratio of spelling error count to paragraph count |
| 37 | Ratio of likely typo count to character count |
| 38 | Ratio of likely typo count to total character count |
| 39 | Ratio of likely typo count to word count |
| 40 | Ratio of likely typo count to spelling error count |

TABLE 2-continued

Example feature vector

| Feature Number | Feature Description |
|---|---|
| 41 | Ratio of likely typo count to sentence count |
| 42 | Ratio of likely typo count to grammatical error count |
| 43 | Ratio of likely typo count to paragraph count |
| 44 | Ratio of non-space (ns) character count to total character count |
| 45 | Ratio of grammatical error count to ns character count |
| 46 | Ratio of grammatical error count to total character count |
| 47 | Ratio of grammatical error count to word count |
| 48 | Ratio of grammatical error count to sentence count |
| 49 | Ratio of grammatical error count to paragraph count |
| 50 | Ratio of passive sentences to active sentences |
| 51 | Ratio of passive sentences to all sentences |
| 52 | Flesch-Kincaid Reading Ease Statistic |
| 53 | Flesch-Kincaid Grade Level |

Of course, the possible features listed in Table 1 and Table 2 represent only possible examples and are not intended to indicate that all features must be utilized. In fact, analysis may indicate that the feature set may be reduced (sometimes called feature ablation) with little or no impact on the accuracy of the classification. In general, it is desirable to utilize the smallest feature set that gives a sufficient accuracy.

Returning now to FIG. 3, once feature vector 84 has been created, the feature vector is processed by an SVM model in block 86. This processing will result in a classification determination as illustrated in block 88. Block 90 indicates that the snippet contains information of interest and the source document is identified as being of interest.

If the snippet is classified as not containing information of interest, then block 92 indicates that the process will continue as long as there are more classification identifiers located within the document. When no more classification identifiers are found, the next document, if any, is examined.

As indicated by SVM model data 94, the SVM model in block 86 must have input in order to classify a snippet as having information of interest or not. As previously discussed, SVM model data may be different depending on a variety of information, such as the locale or language of the source documents.

SVM model data 94 is typically developed through a training process. This is illustrated by the process outlined in dashed box 96. In this process training documents are typically analyzed and labeled in order to produce documents that are identified as either having information of interest or not (blocks 98, 100, 102). The documents are then analyzed by an SVM model trainer (indicated by block 104).

Figure 5:
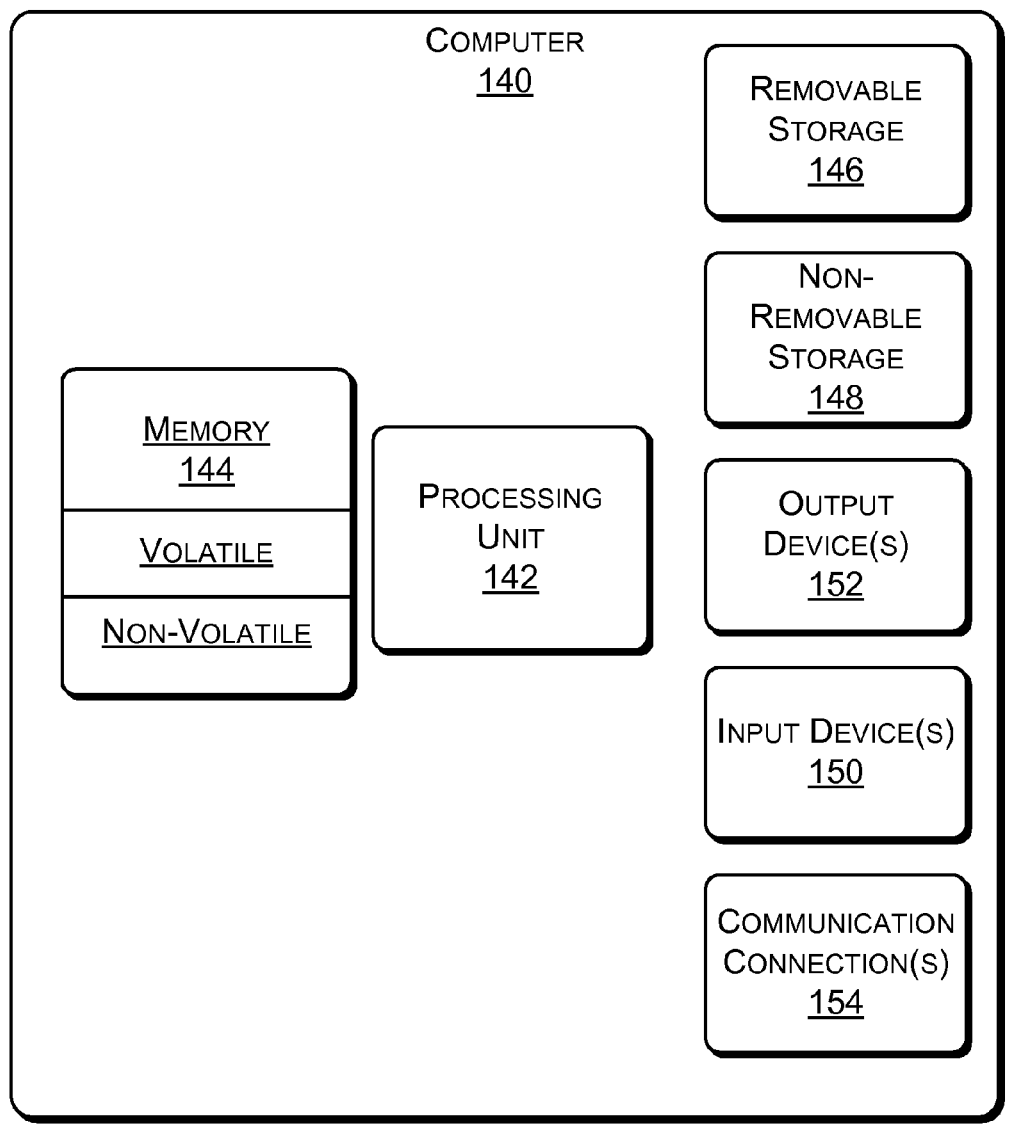
FIG. 5 is an example computer suitable for use to implement the disclosed examples.

The examples and embodiments disclosed herein may be implemented on a variety of computing devices. In general, a computing device may comprise a variety of components. An exemplary computing device is illustrated in FIG. 5. In its most basic configuration, computing device 140 typically includes at least one processing unit 142 and memory 144. Depending on the exact configuration and type of computing device, memory 144 may be volatile (such as RAM), non-volatile (such as ROM, flash memory, etc.) or some combination of the two. Additionally, in some configurations, computing device 142 may also have mass storage (removable and/or non-removable) such as magnetic or optical disks, solid state removable memory, or tape. These are illustrated generally in FIG. 5 by 146 and 148. Similarly, computing device 140 may also have input devices such as a keyboard or keypad, pointing device, or other type of input device and/or output devices such as a display or other output device. These are generally indicated in FIG. 5 as 150 and 152, respectively. In embodiments where communication with other devices or a network is important, such as where source documents of interest are accessed over the network, computing device 140 may also have one or more mechanisms to communicate with other devices or a network. These are illustrated in FIG. 5 by 154. Such types of communication mechanisms include network connections to other devices, computers, networks, servers, etc. using either wired or wireless media. All these devices are well know in the art and need not be discussed at length here.

Furthermore, while particular examples and possible implementations have been called out above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed process to any order except as may be specified in the claims.

What is claimed is:

1. A machine-implemented method for determining whether documents being searched are relevant to a desired piece of information, the method comprising:

accessing documents stored in electronic form in a memory;

automatically classifying, by a processor, documents in an initial set of source documents of the electronic documents into one of at least three groups, where the classifying is performed by a first classifier comprising an untrained rules-based classifier applying rules to text of the documents to determine presence and absence of classification identifiers in the initial set of source documents, the first classifier comprising software executing on a machine, the at least three groups comprising a first group containing documents determined by the untrained rules-based classifier to be of interest to the desired piece of information, a second group containing documents determined by the untrained rules-based classifier to be not of interest to the desired piece of information, and a third group containing documents that the untrained rules-based classifier did not place in the first group or the second group, the first classifier classifying by the processor:

determining the presence or absence of at least one classification identifier in a source document;

if the at least one classification identifier is absent within the source document then classifying the source document into the second group;

if the at least one classification identifier is present within the source document then extracting, with a snippet extractor a snippet from the document and determining the presence or absence of at least one keyword within the snippet wherein the snippet is selected based on structures of the source document; and if at least one keyword is present within the snippet, then classifying the source document into the first group, and otherwise classifying the source document into the third group; and for each document classified into the third group, the processor:

extracting from a document at least one feature vector; and classifying the document with a second classifier into either the first group or the second group based on the at least one feature vector, wherein the second classifier comprises a support vector machine (SVM) trained, prior to the classifying, with a plurality of labeled training documents, the labeled training documents having been labeled according to analysis of the documents prior to performance of the method, and where the second classifier comprises software executing on the machine.

2. The method of claim 1 wherein the classification identifier is dependent on at least language or locale or both.

3. The method of claim 1 wherein the initial set of source documents is classified into the three groups by:

selecting one of the source documents;

examining the source document to determine the presence or absence of the classification identifier;

based on the presence or absence of the classification identifier, classifying the source document either into the second group or identifying the source document as requiring further examination;

if the source document requires further examination, then extracting from the source document a snippet based at least in part on the classification identifier; and searching the snippet for further information and based on the presence or absence of the information, classifying the source document into one of the groups.

4. The method of claim 3 wherein the further information is dependent on at least language or locale or both.

5. A storage memory having executable instructions stored thereon, when executed by a processor carry out a method comprising:

a first classifier comprising an untrained rules-based classifier classifying an initial set of electronic source documents into one of at least three groups by applying rules to text of the documents to determine presence and absence of classification identifiers in the initial set of electronic documents, a first group containing documents determined by the first classifier to have a sufficient probability of being of interest for a given piece of information, a second group containing documents determined by the first classifier to have sufficient probability of being not of interest for the given piece of information, and a third group containing documents analyzed by the first classifier but not determined by the first classifier to have sufficient probability of being of interest or not of interest for the given piece of information, the first classifier having input comprising at least one classification identifier used to make its classification determinations, the first classifier classifying by:

determining the presence or absence of the at least one classification identifier in a source document;

if the at least one classification identifier is absent within the source document then classifying the source document into the second group;

if the at least one classification identifier is present within the source document then extracting, with a snippet extractor, a snippet from the document and determining the presence or absence of at least one keyword within the snippet, wherein the snippet is extracted based on structures of the source document; and if at least one keyword is present within the snippet, then classifying the source document into the first group, and otherwise classifying the document into the third group;

a feature extractor extracts features from a document classified into the third group and to form at least one feature vector corresponding to the document; and a second classifier receiving input comprising the at least one feature vector and further classifying the document associated with the at least one feature vector into either the first group or the second group based on the at least one feature vector, the second classifier comprising a learning to classify documents by being trained with labeled training documents prior to performing classification.

6. The storage memory of claim 5 wherein the classification identifier comprises a currency identifier.

7. The storage memory medium of claim 6 wherein the at least one keyword comprises information that would indicate the currency identifier is associated with a price.

8. The storage memory of claim 5 wherein the at least one feature vector comprises a ratio metric calculated by taking the ratio of the count at least one type of HTML tag to the total number of HTML tags in a document.

9. The storage memory of claim 5 wherein the at least one feature vector comprises at least one of either: an image element; a link element; a text element; or a ratio metric.

10. A computing device for determining whether electronic documents being searched are relevant to a given piece of information, the device comprising:

a first classifier in a memory of the computing device, the first classifier comprising an untrained rules-based classifier classifying documents in an initial set of source documents of the electronic documents into at least three groups by applying rules to text of the documents to determine presence and absence of classification identifiers in the initial set of source documents, a first group containing documents determined by the first classifier to be of interest to the desired piece of information, a second group containing documents determined by the first classifier not to be of interest to the desired piece of information, and a third group containing documents that the first classifier did not classify into the first group or second group, the first classifier using a processor of the computing device to classify by:

applying rules describing text content to determine the presence or absence of at least one classification identifier in a source document from the initial set of source documents;

if the at least one classification identifier is absent from the source document then classifying the source document into the second group;

if the at least one classification identifier is present within the source document then extracting a snippet from the document containing the classification identifier and determining the presence or absence of at least one keyword within the snippet;

if the at least one keyword is present within the snippet, then classifying the source document into the first group, and otherwise classifying the document into the third group;

a feature extractor, in the memory of the computing device, extracting, with the processor, features from the snippet associated with the document classified into the third group and to form at least one feature vector from the snippet; and a second classifier, in the memory of the computing device, receiving input comprising the at least one feature vector and further classifying the document associated with the at least one feature vector into either the first group or the second group based on the at least one feature vector, wherein the second classifier learns to classify documents by being trained with labeled training documents prior to the classifying such that classification outcomes for the inputted feature vector depend on the training documents.

11. The device of claim 10 wherein the at least one feature vector comprises a ratio metric calculated by taking the ratio of the count at least one type of HTML tag to the total number of HTML tags in a document.

12. The device of claim 10 wherein the at least one feature vector comprises at least one of either: an image element; a link element; a text element; or a ratio metric.

13. The device of claim 10 wherein the classification identifier comprises a currency identifier.

* * * * *